(12) United States Patent
Adiletta et al.

(10) Patent No.: US 8,740,363 B2
(45) Date of Patent: Jun. 3, 2014

(54) SOLID INK PRINTER WITH MAGNETIC INK MIXING

(75) Inventors: Mark A. Adiletta, Fairport, NY (US);
Roger G. Leighton, Hilton, NY (US);
John R. Uchal, Webster, NY (US);
David K. Ahl, Rochester, NY (US);
Guido N. Dimatteo, Ontario, NY (US);
Paul A. Hosier, Rochester, NY (US);
Joseph H. Lang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 172 days.

(21) Appl. No.: 13/476,061

(22) Filed: May 21, 2012

(65) Prior Publication Data
US 2013/0307909 A1    Nov. 21, 2013

(51) Int. Cl.
*B41J 2/175* (2006.01)
*C09D 11/00* (2014.01)

(52) U.S. Cl.
CPC ............. *B41J 2/17593* (2013.01); *C09D 11/34* (2013.01)
USPC ........................................................ 347/88

(58) Field of Classification Search
CPC .............................. B41J 2/17593; C09D 11/34
USPC ........................................................ 347/88
See application file for complete search history.

(56) References Cited

U.S. PATENT DOCUMENTS

| 4,614,948 | A | * | 9/1986 | Katerberg et al. ............... 347/89 |
| 4,812,856 | A | | 3/1989 | Wallace |
| 6,039,442 | A | * | 3/2000 | Hagiwara et al. ............... 347/89 |
| 6,695,441 | B2 | | 2/2004 | Asano |
| 6,938,984 | B2 | | 9/2005 | German et al. |
| 7,942,488 | B2 | | 5/2011 | Lang |
| 2004/0061747 | A1 | * | 4/2004 | Nakao et al. ..................... 347/85 |
| 2006/0209146 | A1 | * | 9/2006 | Reeves ........................... 347/88 |
| 2009/0321676 | A1 | * | 12/2009 | Breton et al. .............. 252/62.53 |
| 2010/0149903 | A1 | * | 6/2010 | Imai et al. ....................... 366/77 |
| 2012/0013659 | A1 | | 1/2012 | Nishimura |

OTHER PUBLICATIONS

US 7,831,080, 11/2010, Sato (withdrawn)

* cited by examiner

*Primary Examiner* — Stephen Meier
*Assistant Examiner* — Alexander D Shenderov
(74) *Attorney, Agent, or Firm* — Maginot, Moore & Beck, LLP

(57) ABSTRACT

A phase change inkjet printer is equipped with an agitator to prevent settling of metal particles in melted magnetic phase change ink. The agitator operates to agitate the melted magnetic phase change ink as the ink enters the printhead to maintain the metal particles in suspension within the melted ink.

5 Claims, 6 Drawing Sheets

SOLID INK PRINTER WITH MAGNETIC INK MIXING

TECHNICAL FIELD

This disclosure relates generally to inkjet printers that utilize magnetic ink, and more particularly, to devices that help keep magnetic particles suspended in the magnetic ink used in such printers.

BACKGROUND

Solid ink or phase change ink printers conventionally receive ink in a solid form, sometimes known as solid ink sticks. The solid ink sticks are typically inserted through an insertion opening of an ink loader for the printer, and are moved by a feed mechanism and/or gravity toward a heater plate. The heater plate melts the solid ink impinging on the plate into a liquid that is delivered to a melt reservoir. The melt reservoir maintains the ink in a melted state and delivers the ink to a printing system of the printer for ejection onto an image receiving surface. The image receiving surface can be the surface of media, such as paper, or a liquid layer of release agent supported by an intermediate imaging member, such as a metal drum or belt.

Currently, efforts are underway to use phase change inks in magnetic character ink recognition (MICR) printing. MICR printing uses aqueous magnetic inks to print characters on financial documents to enable character recognition technology that detects the characters with magnetic detectors. This technology is used primarily in the banking industry to facilitate the processing of checks. The technology allows magnetic readers to read information, such as routing numbers and account numbers, from printed documents. Unlike barcodes or similar technologies, however, MICR codes can also be easily read by humans.

MICR printing ink typically includes a suspension of metal particles, such as iron oxide, which enable the magnetic readers to recognize the printed characters. In MICR solid ink, the metal particles are suspended in a phase change medium. When MICR solid ink is melted and in a liquid state, the metal particles can be pulled downwardly by gravity and collect in the lower regions of melted ink containers and passageways in a printer. The metal particles settling out of the ink can degrade the uniform distribution of magnetic particles in the ink that can make characters printed with the non-uniform ink difficult to detect.

Uniform distribution of metal particles in phase change ink is more difficult than maintaining such distribution in aqueous inks because the viscosity of the phase change ink and the ability of the ink to change phase affects the flow dynamics of the ink. Consequently, previously known methods of maintaining a uniform distribution of metal particles in aqueous inks are not as effective or robust with phase change inks. Thus, a need exists for devices and methods that help maintain a uniform distribution of metal particles in phase change ink as the ink is used in an inkjet printer.

SUMMARY

In accordance with one embodiment, a printer that ejects magnetic phase change ink comprises a printhead configured to eject drops of melted phase change ink having metal particles. The printhead includes an inlet for receiving melted phase change ink and an onboard reservoir fluidly connected to the inlet to hold a quantity of melted phase change ink received through the inlet. An agitator is configured to produce turbulence in the melted phase change ink entering the inlet of the printhead to maintain the metal particles in suspension within the melted phase change ink as the melted phase change ink enters the printhead.

In accordance with another embodiment, a method of operating a printing apparatus comprises transporting melted ink through a heated conduit to an inlet of an onboard reservoir of a printhead of a phase change ink printer, the melted ink having metal particles; and producing turbulence in the melted magnetic ink melted phase change ink entering the inlet of the printhead with an agitator to maintain the metal particles in suspension within the melted phase change ink as the melted ink enters the inlet of the onboard reservoir.

In accordance with yet another embodiment, a printer configured to eject melted magnetic phase change ink comprises a printhead configured to eject drops of melted phase change ink having metal particles. The printhead includes an inlet for receiving the melted phase change ink and an onboard reservoir fluidly connected to the inlet to hold a quantity of melted phase change ink received through the inlet. A heated conduit is fluidly connected to the inlet for delivering melted phase change ink to the onboard reservoir from a source of melted phase change ink. An agitator is mechanically coupled to one of the heated conduit and the onboard reservoir. The agitator is configured to produce turbulence in the melted ink to maintain the metal particles in suspension within the melted phase change ink.

DRAWINGS

DETAILED DESCRIPTION

Figure 1:
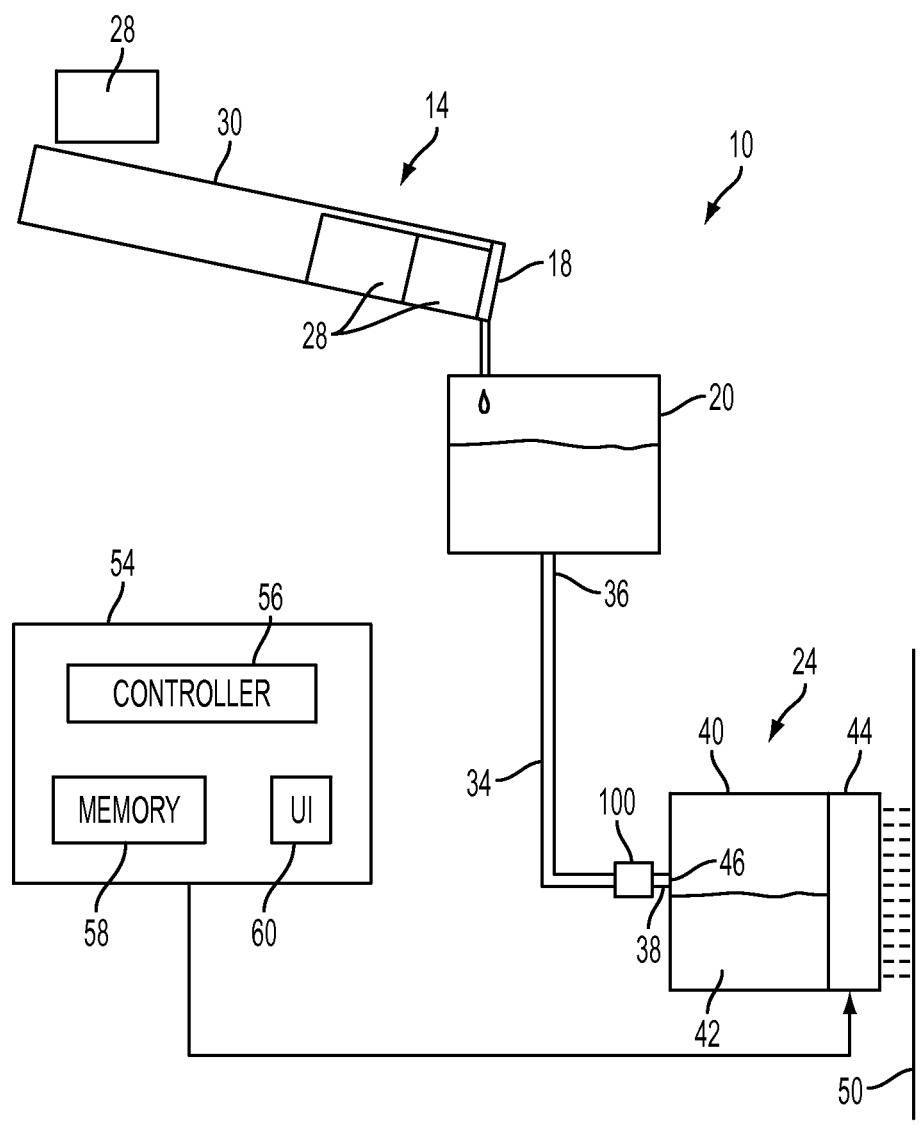
FIG. 1 is a simplified schematic view of a phase change ink printer configured to utilize magnetic ink that includes a magnetic ink agitation system in accordance with the present disclosure.

For a general understanding of the present embodiments, reference is made to the drawings. In the drawings, like reference numerals have been used throughout to designate like elements. As used herein, the term "printer" generally refers to an apparatus that produces an ink image on print media and can encompass any such apparatus, such as a digital copier, bookmaking machine, facsimile machine, multi-function machine, etc., which performs a printing function for any purpose.

As used herein, the term "inkjet printer" generally refers to a device that produces ink images on print media by ejecting ink onto an image receiving surface. "Print media" can be a physical sheet of paper, plastic, or other suitable physical print media substrate for images, whether precut or web fed. A printer can include a variety of other components, such as finishers, paper feeders, and the like, and can be embodied as a copier or a multifunction machine. Image data generally includes digital data which is rendered for use to operate inkjet ejectors in printheads to form ink images on an image receiving surface and can include text, graphics, pictures, and the like.

As used herein, the term "ink" refers to a colorant that is liquid when applied to an image receiving surface. For example, ink can be aqueous ink, ink emulsions, solvent based inks and phase change inks. "Phase change ink" refers to inks that are in a solid or gelatinous state at room temperature and change to a liquid state when heated to an operating temperature for application or ejection onto an image receiving surface. The phase change inks return to a solid or gelatinous state when cooled on the print media after the printing process. As used herein, the term "magnetic ink" refers to an ink that includes a suspension of magnetic particles, such as iron oxide, in a liquid or phase-change medium.

The term "printhead" as used herein refers to a component in the printer that is configured to eject ink drops onto an image receiving surface. A typical printhead includes a plurality of inkjet ejectors that are configured to eject ink drops of one or more ink colors onto the print media. The inkjet ejectors are arranged in an array of one or more rows and columns. In some embodiments, the inkjet ejectors are arranged in staggered diagonal rows across a face of the printhead. Various printer embodiments include one or more printheads that form ink images on an image receiving surface.

FIG. 1 is a simplified schematic view of a portion of a phase change ink, or solid ink, printer 10. The printer 10 includes a solid ink loader 14, an ink melter 18, an ink melt reservoir 20, and a printhead 24. The ink loader 14, ink melter 18, melt reservoir 20, and a printhead 24 are configured to utilize a magnetic solid ink, and in particular, a magnetic solid ink that is suitable for use in Magnetic Ink Character Recognition (MICR) printing.

The ink loader 14 is configured to receive magnetic solid ink, such as blocks of ink 28, which are commonly called ink sticks. The ink loader 14 includes feed channels 30 into which ink sticks 28 are inserted. Although a single feed channel 30 is depicted in FIG. 1, the ink loader 14 can include a separate feed channel 30 for each type, color or shade of ink stick 28 used in the printer 10.

Each feed channel 30 guides ink sticks 28 to an ink melter 18 where the sticks are heated to a phase change ink melting temperature to melt the solid ink into a liquid. Any suitable melting temperature can be used depending on the solid ink formulation of the ink sticks. In one embodiment, the solid ink melting temperature is approximately 80° C. to 130° C.

The melted ink is directed gravitationally or by pressurizing devices from the ink melter 18 to an ink melt reservoir or tank 20. A separate melt reservoir 20 can be provided for each ink color, shade, or composition used in the printer 10. Alternatively, a single reservoir housing can be compartmentalized to contain the differently colored inks. Each melt reservoir 20 can include a heating element (not shown) operable to heat the ink contained in the corresponding reservoir to a temperature suitable for melting the ink and/or maintaining the ink in liquid form, at least during appropriate operational states of the printer 10.

Melted ink is transported from the melt reservoir 20 to the printhead 24 by at least one heated conduit or tube, such as heated conduit 34. The heated conduit 34 includes an inlet end 36 which is fluidly connected to an ink source, such as the melt reservoir 20, and an outlet end 38 that is fluidly connected to an inlet 46 of a printhead 40. A lumen within the conduit enables ink to flow from the reservoir 20 to the printhead 24. The printhead 24 can be a single printhead having a width that enables most or all of a width of an image receiving surface to be printed by the printhead. Alternatively, a plurality of printheads 24, each of which covers only a portion of the width of the image receiving member, can be arranged in a known manner to cover most or all of the width of the image receiving member. Each printhead 24 includes a housing 40 in which a plurality of inkjet ejectors 44 and an onboard reservoir 42 are provided.

The onboard reservoir 42 includes at least one inlet 46 that is fluidly coupled to the heated conduit 34 to receive melted ink from the melt reservoir. The onboard reservoir 42 maintains a quantity of melted ink for the ejectors 44. The ejectors 44 receive the melted ink from the reservoir 42 and eject drops of melted ink onto the ink receiving surface 50 in response to receiving firing signals from the control system 54.

Figure 2:
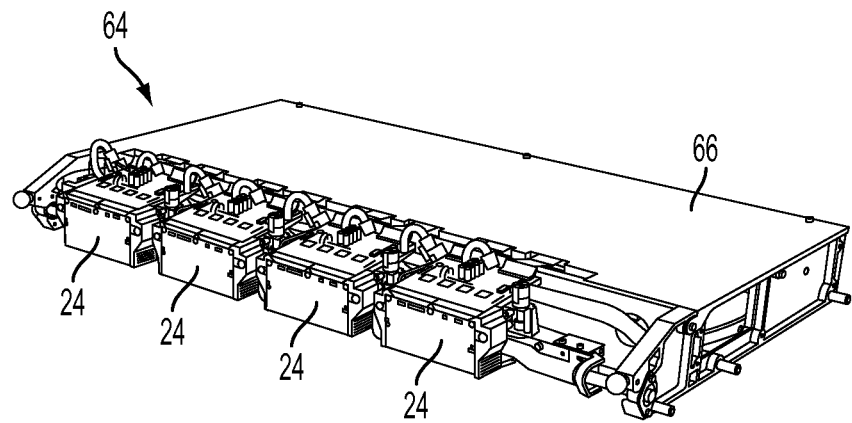
FIG. 2 is a perspective view of one embodiment of a printhead assembly for a phase change ink printer.

FIG. 2 depicts an embodiment of a printhead assembly 64, referred to herein as a print box unit (PBU), in which a plurality of printheads 24 is mounted. The PBU includes a plurality (e.g., four in FIG. 2) of printheads 24 that are arranged in a linear array and secured to a support housing 66. The PBU 64 is secured to the frame (not shown) of a printer with the printheads 24 extending across the width of the media pathway (not shown) of the printer. The PBU 64 can be installed and removed from the printer as a unit which facilitates customization as well as maintenance of the printer.

Figure 3:
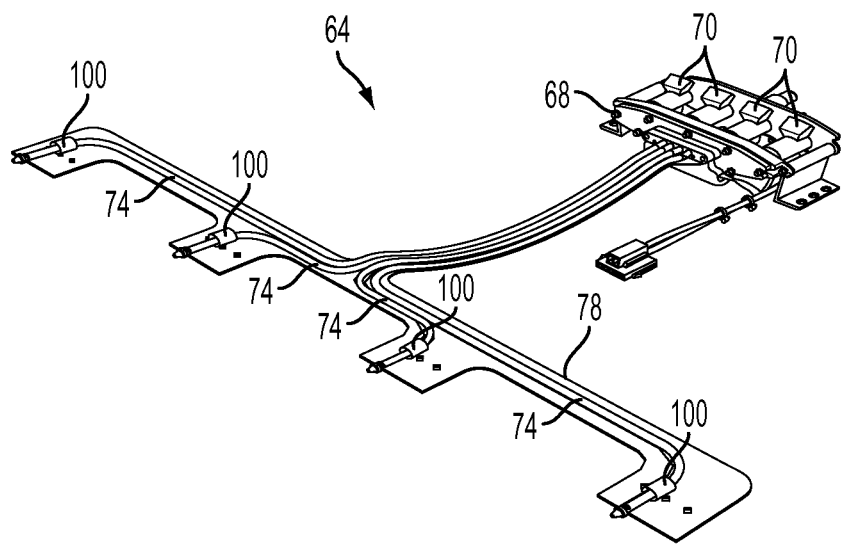
FIG. 3 is a perspective view of the ink transport system of the printhead assembly of FIG. 2.

FIG. 3 depicts the ink transport system of the PBU 64 without the housing 66 and printheads 24. As depicted in FIG. 3, the PBU 64 includes a manifold 68, which receives melted ink from the melt reservoir (FIG. 1). The manifold includes a plurality of ink injectors 70 for supplying melted ink to the printheads. Each injector 70 is fluidly connected to the onboard reservoir of the one of the printheads by a heated conduit 74. The heated conduits 74 of FIG. 3 are supported by a conduit support 78.

The printer 10 of FIG. 1 may be configured as a direct or an indirect printer. In a direct printer, the ejectors 44 are configured to eject drops of ink directly onto print media. In an indirect printer, the ink receiving surface 50 comprises the surface of an intermediate member, such as a rotating drum or belt. The melted ink is ejected onto the surface of the intermediate member, and then print media is pressed against the surface of the intermediate member on top of the ink to transfer the ink to the print media (not shown).

A control system 54 (FIG. 1) aids in operation and control of the various subsystems, components, and functions of the printer 10. The control system 54 includes a controller 56, electronic storage or memory 58, and a user interface (UI) 60. The controller 56 comprises a processing device, such as a central processing unit (CPU), an application specific integrated circuit (ASIC), a field programmable gate array (FPGA) device, or a microcontroller. Among other tasks, the processing device processes image data received from image sources, such as scanners or network computers (not shown), to generate signals for operating the inkjet ejectors of one or more printheads 24.

The controller 56 is configured to execute programmed instructions that are stored in the memory 58. The controller 56 executes these instructions to operate the components and subsystems of the printer 10. Any suitable type of memory or electronic storage can be used. For example, the memory 58 can be a non-volatile memory, such as read only memory (ROM), or a programmable non-volatile memory, such as EEPROM or flash memory. User interface (UI) 60 comprises a suitable input/output device located on the printer 10 that enables operator interaction with the control system 54. For example, UI 60 can include a keypad and display (not shown).

MICR solid ink contains a suspension of metal particles that enable a magnetic reader to recognize characters printed with the ink. The characters are most easily and accurately recognized when the metal particles are uniformly distributed within the ink. The metal particles, however, can settle in the lower regions of melted ink containers and passageways and disrupt the uniform distribution of the particles within the ink. The metal particles settling out of the ink degrades the magnetic properties of the ink and can make it unsuitable for its intended purpose. To address the difficulties posed by the settling of metal particles in magnetic solid ink, an ink agitator 100 is configured to help maintain the uniform distribution of the melted particles within the melted ink. As shown in FIG. 1, the agitator 100 is positioned to produce turbulence in the melted ink contained in the heated conduit 34 proximate the inlet 46 of the onboard reservoir 42 of the printhead 24.

Figure 4:
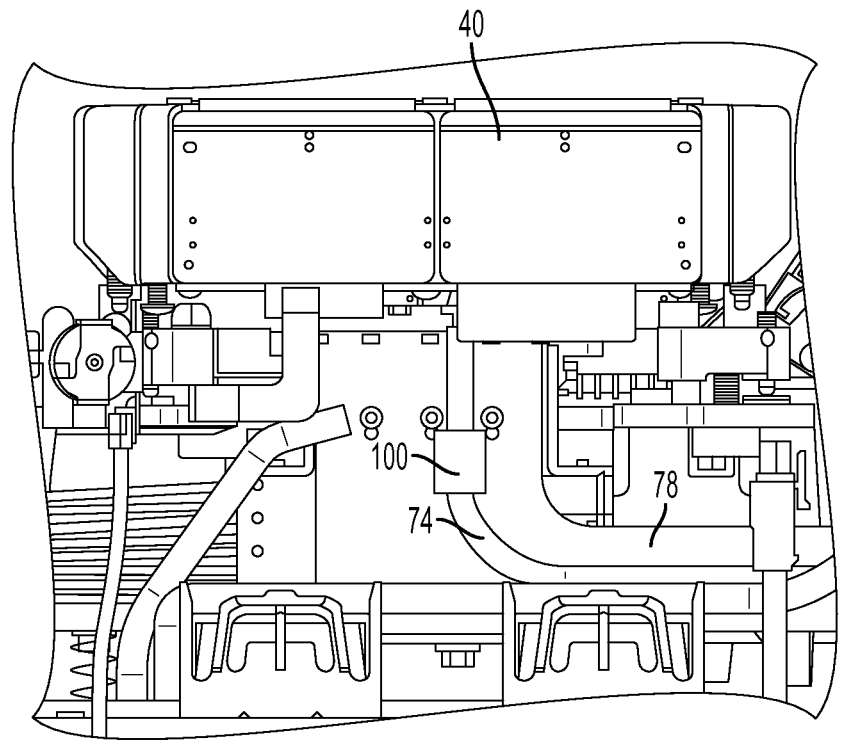
FIG. 4 is a top view of a printhead of the printhead assembly of FIG. 2.

In one embodiment, the agitator 100 is positioned inline between the melt reservoir 20 and the printhead reservoir 42 in one of the printheads to act on the melted ink being transported by the heated conduit 34 to the printhead 40. As depicted in FIGS. 3 and 4, for example, the inline agitator 100 is attached to the conduit support 78 and operatively connected to the heated conduit 74 at the end of each conduit 74 proximate the printhead(s) 24. The conduit support 78 provides a surface for mounting the agitators 100 and includes electrical terminals (not shown) for electrically connecting the agitators 100 to power and control wiring (not shown).

Figure 5:
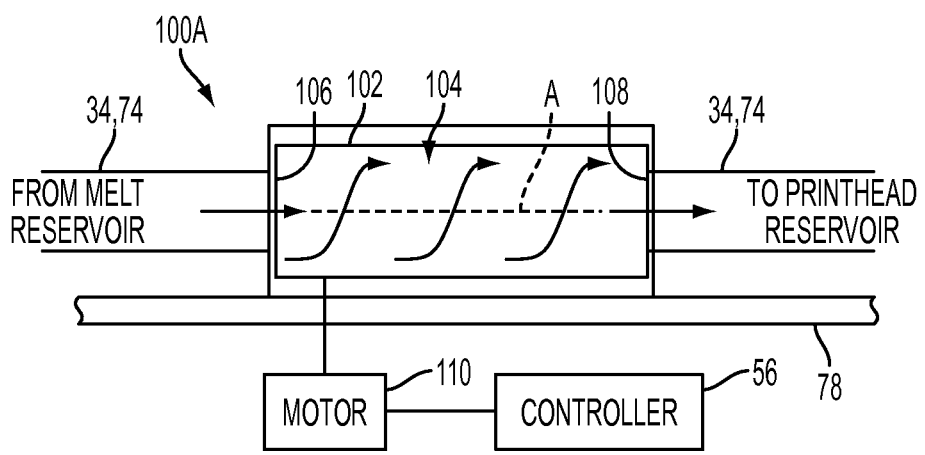
FIG. 5 is a schematic view of one embodiment of an agitator for the printing system of FIG. 1 in the form of a rotating drum.
Figure 6:
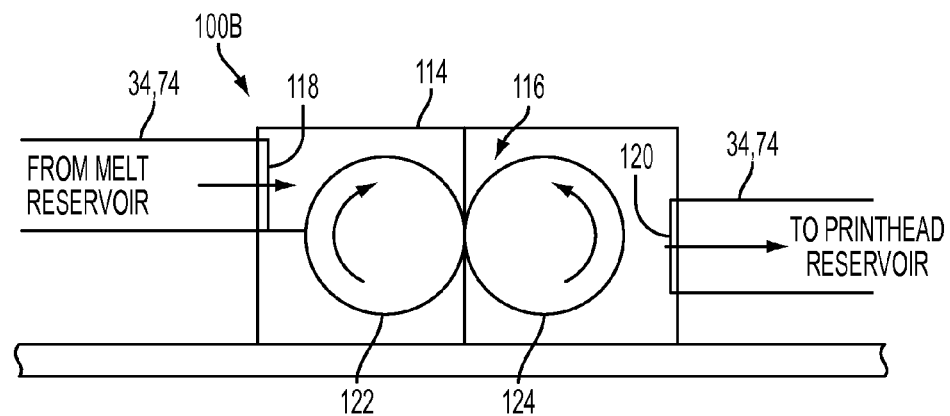
FIG. 6 is a schematic view of another embodiment of an agitator for the printing system of FIG. 1 in the form of counter rotating fingers.

FIGS. 5-8 depict various embodiments of inline agitators 100A-100D that can be incorporated into the printer 10. In the embodiments of FIGS. 5 and 6, the agitator 100A, 100B is configured to act on the ink directly to produce turbulence in the ink whereas in the embodiments of FIGS. 7 and 8, the agitator 100C, 100D is configured to act on the heated conduit 34 to produce turbulence in the ink.

Referring to FIG. 5, the agitator 100A comprises a rotating drum 102 that has an interior cavity 104 with an inlet 106 and an outlet 108. The inlet 106 is fluidly connected to receive melted ink from the melt reservoir 20 (or manifold 68) via heated conduit 34. The outlet 108 is fluidly connected to the inlet of the onboard reservoir of the printhead by a portion of the heated conduit. The drum 102 is operatively connected to an actuator 110, such as a motor, that is configured to rotate the drum 102 at one or more predetermined rates. The motor 110 in turn is operatively connected to the controller 56 in control system 54 for selectively controlling the activation and deactivation of the agitator 100A.

The axis of rotation A of the drum 102 is aligned with the longitudinal axis of the heated conduit. The rotating drum 102 therefore works similar to a cement mixer by turning the melted ink over as it moves from the inlet 106 to the outlet 108 of the drum. The rate of rotation of the drum 102 does not have to be high to maintain the metal particles in suspension, and in one embodiment is approximately 6 rpm although any suitable rate of rotation can be utilized. The rate of rotation can be constant or can be varied based on various factors, such as operating state, print rate, type of print job, and the like.

In the embodiment of FIG. 5, agitation is caused by the movement of the drum or housing 102 of the agitator. The agitator 100B of FIG. 6 includes a housing 114 that has an interior cavity 116 with an inlet 118 and an outlet 120 similar to FIG. 5. The agitator 100B includes mixers 122, 124, which are configured in the interior cavity 116 for rotation, as indicated in the figure, to produce turbulence in the ink sufficient to maintain the distribution of the metal particles in the ink. In the embodiment of FIG. 6, the mixers 122, 124 are in the form of counter rotating fingers, such as intermeshing gears, which are rotatably mounted in the interior cavity 116 of the housing 114.

In one embodiment, the fingers are driven to rotate by the flow of melted ink through the agitator. For example, the first set of fingers rotate in response to the ink entering the cavity from the inlet. The second set of fingers is connected to the first set of fingers by meshed gears to rotate in the opposite direction from the first set of fingers. In alternative embodiments, the mixers can be operatively connected to an actuator, such as actuator 110, which drives the mixers to rotate with or without the aid of the flowing ink.

Figure 7:
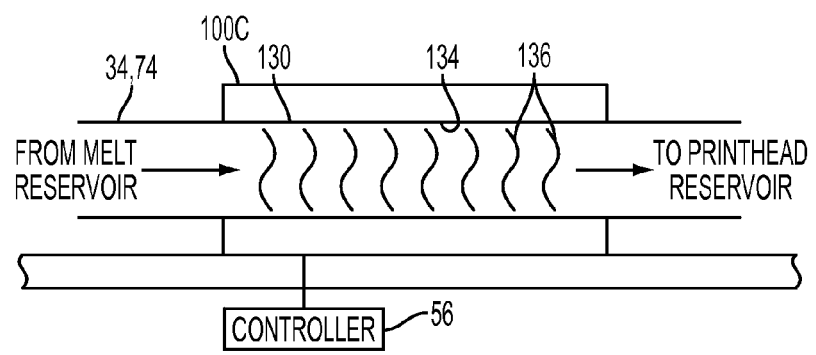
FIG. 7 is a schematic view of another embodiment of an agitator for the printing system of FIG. 1 in the form of a magnetic ring.
Figure 8:
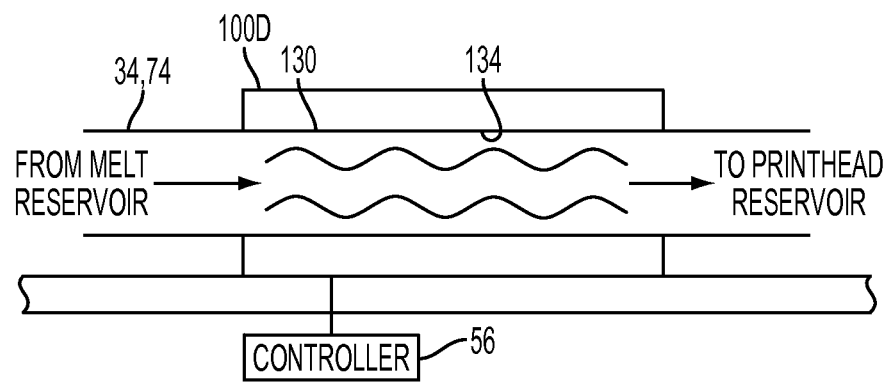
FIG. 8 is a schematic view of another embodiment of an agitator for the printing system of FIG. 1 in the form of an ultrasonic transducer.

In FIGS. 5 and 6, the agitator includes a housing, which receives melted ink from a heated conduit, such as conduit 34 or conduit 74, and directs melted ink back into the heated conduit 34 or 74 connected to the outlet. In FIGS. 7 and 8, the agitator 100C, 100D at least partially surrounds a portion of the lumen 130 of the heated conduit 34 or 74 to provide turbulence in the melted phase change ink being transported in the heated conduit. In the embodiments of FIGS. 7 and 8, the energy that is used to agitate the melted ink is transmitted to the melted ink through the lumen 130 of the heated conduit.

In the embodiment of FIG. 7, the agitator 100C comprises at least one magnetic ring placed around a portion of the outer surface of the conduit 34 or 74. The magnetic ring 100C includes a pass-through opening 134 through which the conduit 34 or 74 extends and is configured to have an alternating ring of North-South magnetic fields. The magnetic ring 100C is operatively connected to the controller 56 and is pulsed on and off at suitable frequencies by the controller 56 to generate magnetic fields 136 that act on the metal particles in the ink to cause turbulence.

FIG. 8 depicts an embodiment of an agitator 100D that comprises an oscillating mechanism configured to vibrate the conduit and thereby agitate the ink. The oscillator 100D is mechanically connected to the conduit so that the energy is transmitted to the ink in the lumen 130. In one embodiment, the oscillator 100D comprises an ultrasonic plate transducer that at least partially surrounds the outer surface of the conduit 34 or 74. The ultrasonic transducer is operatively connected to the controller 56. The controller 56 is configured to activate the ultrasonic plate to oscillate at one or more ultrasonic or near ultrasonic frequencies.

Figure 9:
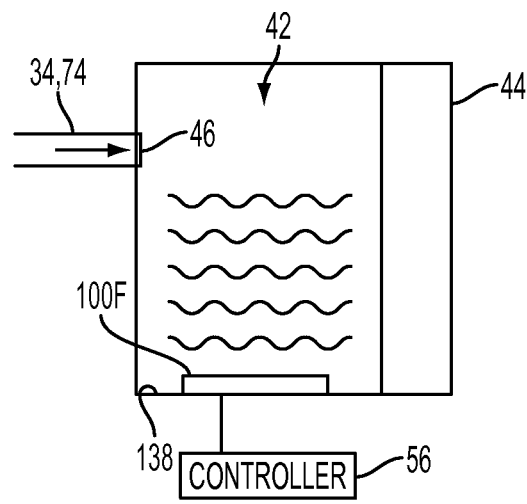
FIG. 9 is a schematic view of an embodiment of an agitator comprising an ultrasonic transducer incorporated into the reservoir of a printhead.

As an alternative to coupling an ultrasonic transducer to the conduit adjacent to the printhead, an ultrasonic transducer 100F can be incorporated into the onboard reservoir 42 of the printhead as depicted in FIG. 9. The ultrasonic transducer 100F comprises a plate that is mechanically coupled onto one of the walls of the housing 40 of a printhead 24. For example, as shown in FIG. 9, the transducer 100F is mechanically coupled to the floor 138 of the reservoir 42. Alternatively, the transducer 100F can be embedded in a wall of the housing 40 during casting.

The ultrasonic transducer 100F is operatively connected to the controller 56. The controller 56 is configured to cycle the transducer 100F on when the printer is idle and to cycle the transducer off during active printing. Otherwise, the vibration induced by the transducer into the printhead reservoir may affect the accuracy of the ink drops ejected from the ejectors in the printhead. In one embodiment, the controller 56 can be configured to activate the transducer 100F only after a certain amount of time has elapsed after an idle state has commenced. For example, in one embodiment, the controller 56 can be configured to activate the transducer 100F after an hour has elapsed the idle state was entered. The use of the transducer 100F in the onboard reservoir 42 is also capable of removing air and gas bubbles from the ink prior to entering the ejectors 44 and dislodging debris and contaminants from the passages of the printhead so it can be cleared through the ejectors.

Figure 10:
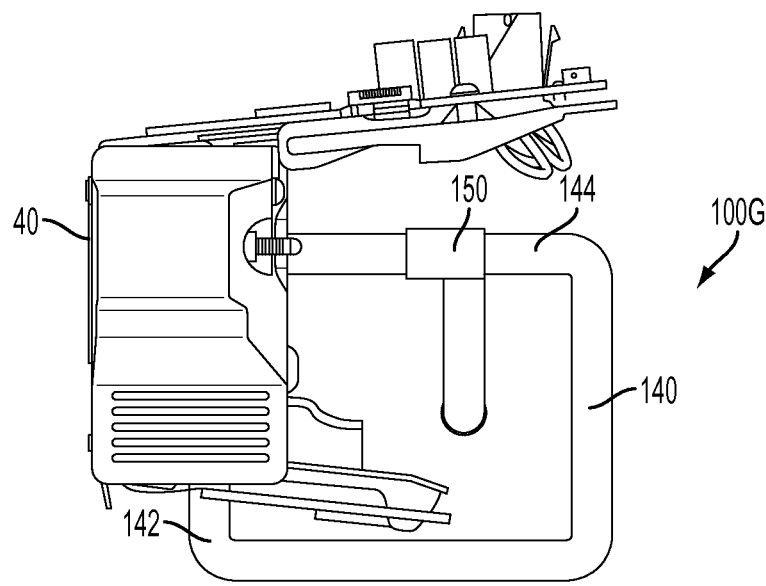
FIG. 10 is a side view of an embodiment of an agitation system comprising a siphon recirculation system incorporated into a printhead.
Figure 11:
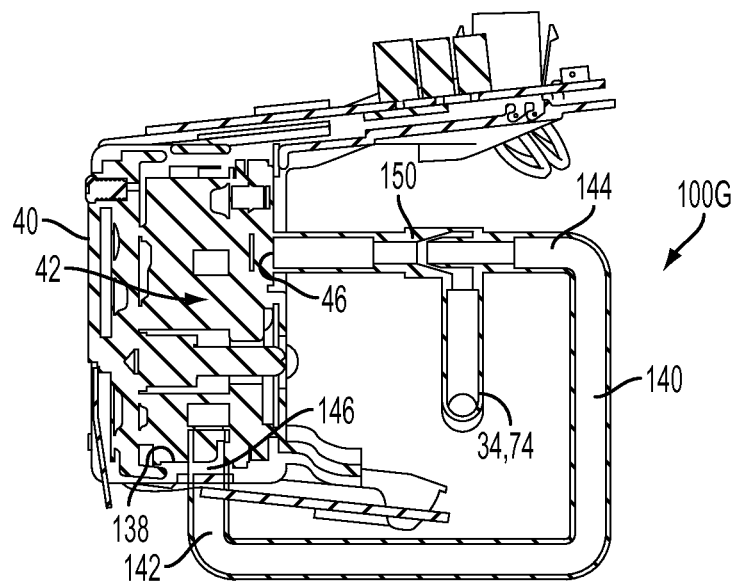
FIG. 11 is a cross-sectional view of the printhead and agitation system of FIG. 10.

FIGS. 10 and 11 depict an embodiment of an agitation system 100G that is configured to utilize a Venturi device or pump 150 to siphon a portion of the magnetic ink out of the bottom of the onboard reservoir 42 of the printhead and mix it with the ink that is being delivered to the printhead. As depicted in FIGS. 10 and 11, the agitation system 100G includes a return conduit 140 having an inlet end 142 and an outlet end 144. The inlet end 142 of the return conduit 140 is fluidly connected to an outlet opening 146 provided in the base or bottom 138 of the onboard reservoir 142. The outlet end of the return conduit is fluidly connected to an inlet 148 in the Venturi device 150.

The Venturi device 150 fluidly connects the heated conduit 34 or 74 and the return conduit 140 to the inlet 46 of the onboard reservoir 42. The Venturi device 150 is configured to generate a vacuum pressure in the return conduit 140 in response to the flow of ink toward the inlet of the onboard reservoir 42. Thus, whenever ink flows into the printhead, a portion of the ink from the onboard reservoir, including the metal particles that have settled out of the mixture, are re-circulated and mixed in with the incoming ink flow. As an alternative to the use of a Venturi device, a pump can be used to generate the pressure drop in the return conduit. Use of a pump requires a power input during standby or sleep mode, but provides the ability to mix the ink at periodic intervals when the machine is not printing.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printer that ejects magnetic phase change ink comprising:
   a printhead configured to eject drops of melted phase change ink having metal particles, the printhead including an inlet for receiving melted phase change ink, an onboard reservoir fluidly connected to the inlet to hold a quantity of melted phase change ink received through the inlet, and an outlet through which melted phase change ink exits the onboard reservoir and the printhead; and
   a pump having a first inlet fluidly connected to the outlet in the printhead, a second inlet fluidly connected to a source of melted phase change ink having metal particles, and an outlet fluidly connected to the inlet of the printhead, the pump being configured to produce turbulence in the melted phase change ink entering the inlet of the printhead to maintain the metal particles in suspension within the melted phase change ink as the melted phase change ink enters the printhead by mixing melted phase change ink received from the outlet of the printhead with melted phase change ink from the source of melted phase change ink and directing the mixed melted phase change ink into the inlet of the printhead.

2. The printing apparatus printer of claim 1, the pump further comprises:
   a siphon that generates a vacuum in the first inlet of the pump in response to the melted phase change ink flowing through the outlet of the pump into the onboard reservoir in the printhead.

3. The printer of claim 2, the pump further comprises:
   a Venturi device.

4. A printer that ejects magnetic phase change ink comprising:
   a printhead configured to eject drops of melted phase change ink having metal particles, the printhead including an inlet for receiving melted phase change ink and an onboard reservoir fluidly connected to the inlet to hold a quantity of melted phase change ink received through the inlet;
   a heated conduit having a first end and a second end and a lumen between the first and the second ends, the lumen enabling melted phase change ink having metal particles to flow through the heated conduit to the inlet of the printhead; and
   at least one magnetic ring having an opening through which the heated conduit extends and which at least partially surrounds a portion of the lumen of the heated conduit, the at least one magnetic ring configured to generate a plurality of magnetic fields at different polarities in the lumen at the portion of the lumen of the heated conduit at least partially surrounded by the magnetic ring to provide turbulence in the melted phase change ink in the lumen of the heated conduit to maintain the metal particles in suspension within the melted phase change ink as the melted phase ink enters the inlet.

5. A printer that ejects magnetic phase change ink comprising:
   a printhead configured to eject drops of melted phase change ink having metal particles, the printhead including an inlet for receiving melted phase change ink and an onboard reservoir fluidly connected to the inlet to hold a quantity of melted phase change ink received through the inlet; and
   a drum having an interior cavity fluidly connected to the inlet of the printhead, the drum being configured to rotate to provide turbulence in the melted phase change ink within the interior cavity to maintain the metal particles in suspension within the melted phase change ink as the melted phase change ink enters the inlet of the printhead.

\* \* \* \* \*